United States Patent
Bomans et al.

[11] Patent Number: 6,163,743
[45] Date of Patent: Dec. 19, 2000

[54] PROCESS AND DEVICE FOR AIDING AERIAL NAVIGATION

[75] Inventors: Muriel Bomans, Antony; Sylvie Grand-Perret, Marcoussis, both of France

[73] Assignee: Sextant Avionique, Velizy Villacoublay, France

[21] Appl. No.: 09/117,452
[22] PCT Filed: Jan. 21, 1997
[86] PCT No.: PCT/FR97/00116
 § 371 Date: Aug. 3, 1998
 § 102(e) Date: Aug. 3, 1998
[87] PCT Pub. No.: WO97/28423
 PCT Pub. Date: Aug. 7, 1997

[30] Foreign Application Priority Data

Feb. 2, 1996 [FR] France .................................. 96 01292

[51] Int. Cl.[7] .............................. G06F 17/00; G06F 7/00
[52] U.S. Cl. .................................. 701/3; 701/14; 701/28; 244/180
[58] Field of Search .................. 701/3, 9, 11, 14, 701/15, 16, 28, 5, 66; 244/186, 183, 185, 180, 181; 73/178 R

[56] References Cited

U.S. PATENT DOCUMENTS 4,845,495  7/1989  Bollard et al. .......................... 701/14
5,445,021  8/1995  Cattoen et al. ......................... 701/206
5,475,594  12/1995 Oder et al. ............................. 701/14

FOREIGN PATENT DOCUMENTS 2 689 231 A1  10/1993  France .

*Primary Examiner*—William A. Cuchlinski, Jr.
*Assistant Examiner*—Gertrude Arthur
*Attorney, Agent, or Firm*—Oblon, Spivak, McClelland, Maier & Neustadt, P.C.

[57] ABSTRACT

The invention relates to processes for aiding aerial navigation. According to the invention, there is proposed a process for aiding aerial navigation, using a flight management system (FMS) which carriers out a dialogue with the pilot by means of several interfaces which include at least one display screen. The flight management system displays on the screen a time-graduated abscissa axis, an altitude-graduated ordinate axis, and, in this system of axes, a plot representing a theoretical path of an aircraft. The flight management system scrolls the time axis and optionally the altitude axis in such a way that the origin of the axes at the instant of display represents, along the abscissa, the time at the instant of display and along the ordinate the altitude of the aircraft at this instant. The pilot thus obtains a better assessment of the time management of the flight.

22 Claims, 3 Drawing Sheets

PROCESS AND DEVICE FOR AIDING AERIAL NAVIGATION

BACKGROUND OF THE INVENTION

1. Field of the Invention

The invention relates to processes and devices for assisting aerial navigation.

2. Discussion of the Background

In general, it is known that in aerodynes (aircraft, helicopters, etc.) of modern design, the pilot must carry out a dialogue with a flight management system, this being a computer on board the aerodyne (we shall subsequently speak of an aircraft) for assisting the pilot in a number of operations. These operations are mainly operations for defining the flight plan before take-off, piloting (manual or automatic) operations during take-off and landing, aerial navigation operations (path calculations, etc.), systematic monitoring operations while cruising or when approaching an airport.

The flight management system operates on the basis of data entered by the pilot, data supplied by sensors distributed throughout the aircraft, and possibly digital data transmitted by radio from the ground or from other aircraft or even satellites.

The dialogue between the flying crew and the flight management system is carried out mainly by means of at least three interfaces, viz.:

- a navigation display on which is represented the plot of the desired course of the aircraft, that is to say a graphical representation of the flight plan of the aircraft and the situation of the aircraft within this plan (in two dimensions);
- a primary flight display which depicts, on the one hand, an artificial horizon which tilts as the aircraft tilts, and, on the other hand, an indication of the longitudinal attitude of the aircraft, and other useful flying indications;
- a flight control unit having manual controls for selecting settings such as the desired heading of the aircraft;
- and finally a keyboard/display console, termed the MCDU ("Multipurpose Control Display Unit"), this being a data display and input console allowing the flying crew to enter data into the flight management system and to read information forwarded by the flight management system on the basis of the data entered.

One of the tasks of the pilot consists in calculating, checking and possibly modifying the flight plan of the aircraft, that is to say the essential elements of the course which he is to follow, especially transits above characteristic points called "waypoints".

The flight plan comprises two components: lateral flight plan which defines the waypoints by their longitudes and latitudes, and vertical flight plan which defines the cruising altitudes and the rates of climb and descent during changes of altitude. These elements of the vertical flight plan are defined with respect to the waypoints.

French patent Application 92 03 643 filed on Mar. 26, 1992 proposed a process for assisting pilotage in which the vertical flight plan is displayed separately from the lateral flight plan on a viewing screen, that is to say instead of displaying the vertical flight plan elements in the form of symbolic or textual indications on the lateral flight plan, a vertical flight plan is displayed separately in the form of a plot in a system with two axes, viz. the distances along the abscissa (with indications of the waypoints) and the altitudes along the ordinate.

In such a process, the plot can also comprise a symbol representing the aircraft, which moves with respect to the graduations of the abscissa and of the ordinate as the aircraft advances, and, advantageously, arrangements may even be made for the symbol of the aircraft to remain fixed along the abscissa and for the abscissa scale to scroll along with the advance of the aircraft; thus, it is chiefly that part of the journey still to be made which appears on the screen, and optionally also part of the path that has already been travelled. The symbol of the aircraft can also remain fixed along the ordinate and in this case the altitude scale would scroll as the aircraft climbs or descends.

The vertical flight plan can be depicted on the navigation display and can occupy either the whole of the screen (the pilot then chooses to display either the vertical flight plan or the lateral flight plan) or one part of the screen, the other part being assigned to the lateral flight plan; the pilot can then see the lateral flight plan and the vertical flight plan at the same time.

SUMMARY OF THE INVENTION

It has been realized that it may be advantageous for the vertical flight plan to be available to the pilot in a different form.

According to the invention, there is proposed a process for aiding aerial navigation, using a flight management system (FMS) which carries out a dialogue with the pilot by means of several interfaces which include at least one display screen, characterized in that the flight management system displays on the screen a time-graduated abscissa axis, an altitude-graduated ordinate axis, and, in this system of axes, a plot representing a theoretical path of an aircraft, and in that the flight management system scrolls the time axis in such a way as to maintain at a fixed position on the screen an abscissa representing the time at the instant of display.

This abscissa is preferably that of the origin of the axes, that is to say that of the intersection of the abscissa and ordinate axes. Preferably, the altitude scale remains fixed, for a given portion of path, but provision may also be made for the system to scroll the altitude axis in such a way as to maintain at a fixed position on the screen an ordinate representing the actual altitude of the aircraft at the relevant instant. This ordinate of fixed position is likewise preferably that of the intersection of the axes.

Consequently, in the process according to the invention, the vertical flight plan is displayed as a function of the actual time rather than as a function of distances with respect to the waypoints. The positions of the waypoints can be indicated on the plot of the path or on the abscissa axis, at abscissae corresponding to the estimated instants of transit through these waypoints.

The invention also proposes a device for aiding aerial navigation using a flight management system which carries out a dialogue with the pilot by means of several interfaces which include at least one display screen, characterized in that it comprises means for displaying on the screen a time-graduated abscissa axis, an altitude-graduated ordinate axis, and, in this system of axes, a plot representing a theoretical path of an aircraft, means being provided for scrolling the time axis in such a way as to maintain at a fixed position on the screen an abscissa representing the time at the instant of display. Means may also be provided for scrolling the altitude axis in such a way as to maintain fixed on the screen an ordinate representing the actual altitude of the aircraft at this instant.

This process and this device allow the pilot better management of time forecasting, also allowing better information regarding the air control and the airline with which the pilot is communicating, and enhanced possibilities for informing passengers. The pilot's assessment of the time forecasts is global and immediate and need no longer be done using specific function keys (except to obtain more accurate computations case by case). This better time prediction is especially appropriate for the understanding of the risks of collision.

BRIEF DESCRIPTION OF THE DRAWINGS

Other characteristics and advantages of the invention will emerge on reading the following detailed description which is given with reference to the appended drawings, in which.

DETAILED DESCRIPTION OF THE PREFERRED EMBODIMENTS

Figure 1:
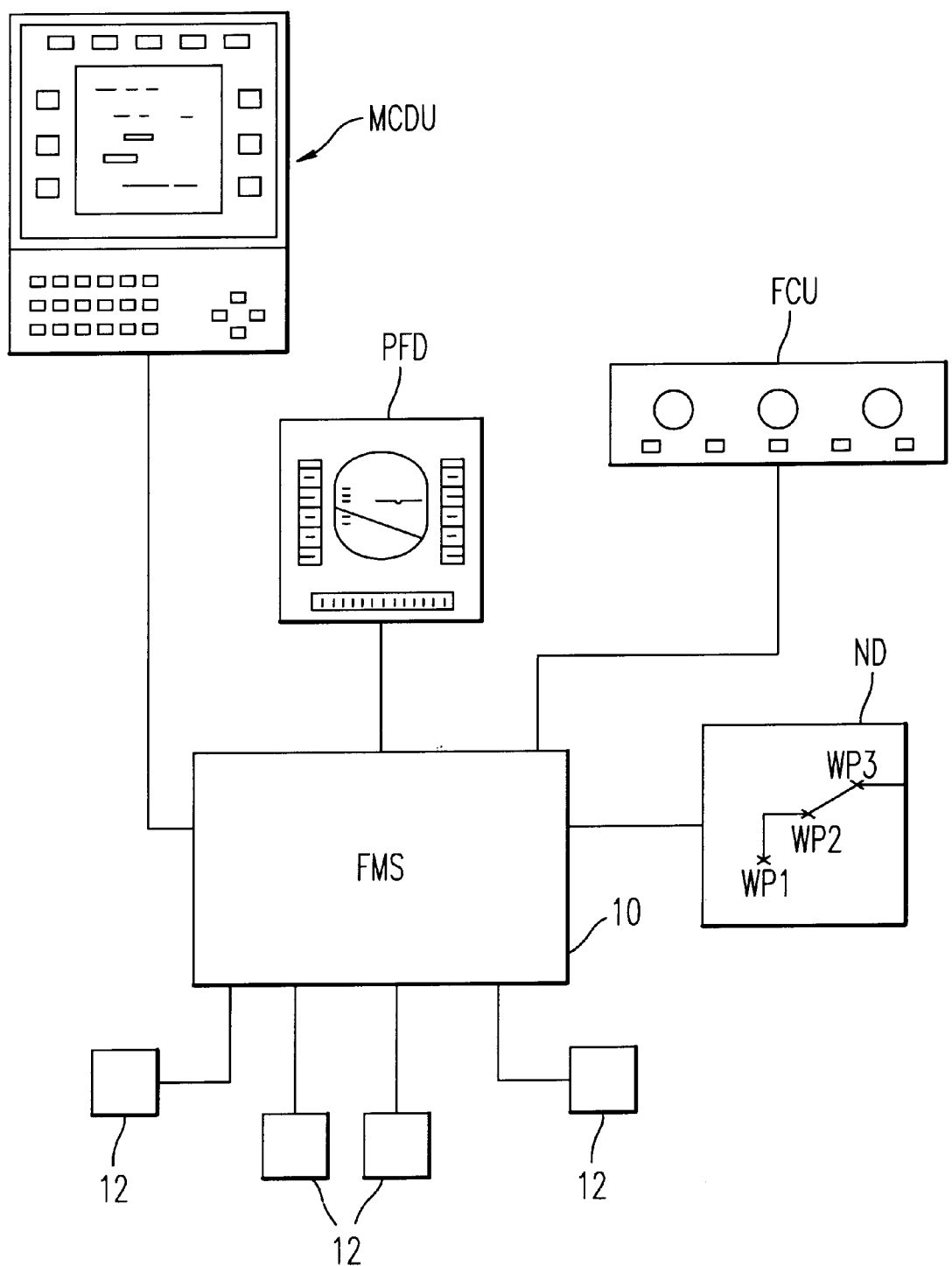
FIG. 1 represents the flight management system FMS and its peripherals.

The device for aiding navigation according to the invention constitutes a part of an overall aircraft monitoring system. This overall system, represented in FIG. 1, essentially comprises:

- the flight management system or FMS, this being a computer 10 which can receive various information, can calculate other information and can forward it to the pilot by means of dialogue interfaces;
- sensors 12 distributed throughout the aircraft, including for example navigation instruments (IRS inertial units, etc.), various sensors giving information about the state of the aircraft, optionally instruments for communicating with the outside, all of these sensors being linked to the flight management system;
- the interfaces for carrying out a dialogue with the pilot, which are linked to the computer 10, and which will mainly include:
- a flight control unit or FCU which makes it possible, with the aid of buttons, to select for example the heading of the aircraft, or other settings which have to be supplied to the management system;
- a screen for displaying navigation information, ND ("Navigation Display"), for displaying maps, flight plans, etc.,
- a primary flight display PFD for displaying an artificial horizon, altitudes of the aircraft, attitudes, velocity vectors, etc.,
- a data display and input console or MCDU ("Multipurpose Control Display Unit").

The vertical flight plan according to the invention will be displayed in principle on the navigation display ND; this display operates under the direct control of software contained in the FMS computer. The vertical flight plan will however not be displayed permanently on the navigation display, but will be displayed in response to the activating of a specific function key of the display.

Figure 2:
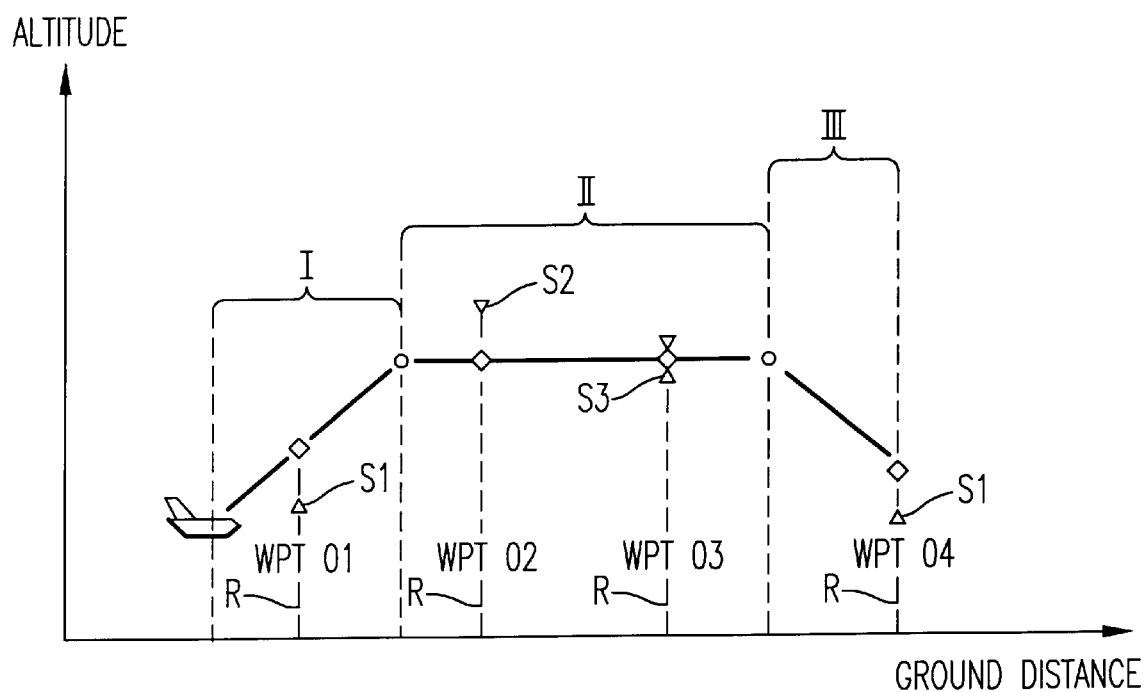
FIG. 2 represents an example of a vertical flight plan according to the prior art.

In FIG. 2 may be seen a vertical flight plan displayed in a manner proposed in the prior art (French Patent Application already cited). The flight plan comprises a segment plot linking several points of transit represented by diamonds. Each diamond corresponds to a waypoint (WPT01 to WPT04) positioned on the abscissa axis which is an axis graduated in distances. The projections of the waypoints onto the abscissa axis are designated by the letter R. The position of the aircraft at the relevant instant is represented by an aircraft symbol at the start of the path. Triangular symbols pointing up (S1) and pointing down (S2) respectively represent minimum and maximum altitude constraints which the aircraft must comply with during its journey. These constraints are generally associated with waypoints and are therefore located on the screen at the same abscissa as the corresponding waypoint. Two head-to-tail triangles which touch at their tip therefore indicate a compulsory altitude of transit (S3).

In the example represented, the path is split up into three parts, with diverse altitude constraints:

I: climbing in altitude
II: cruising level
III: descent

Figure 3:
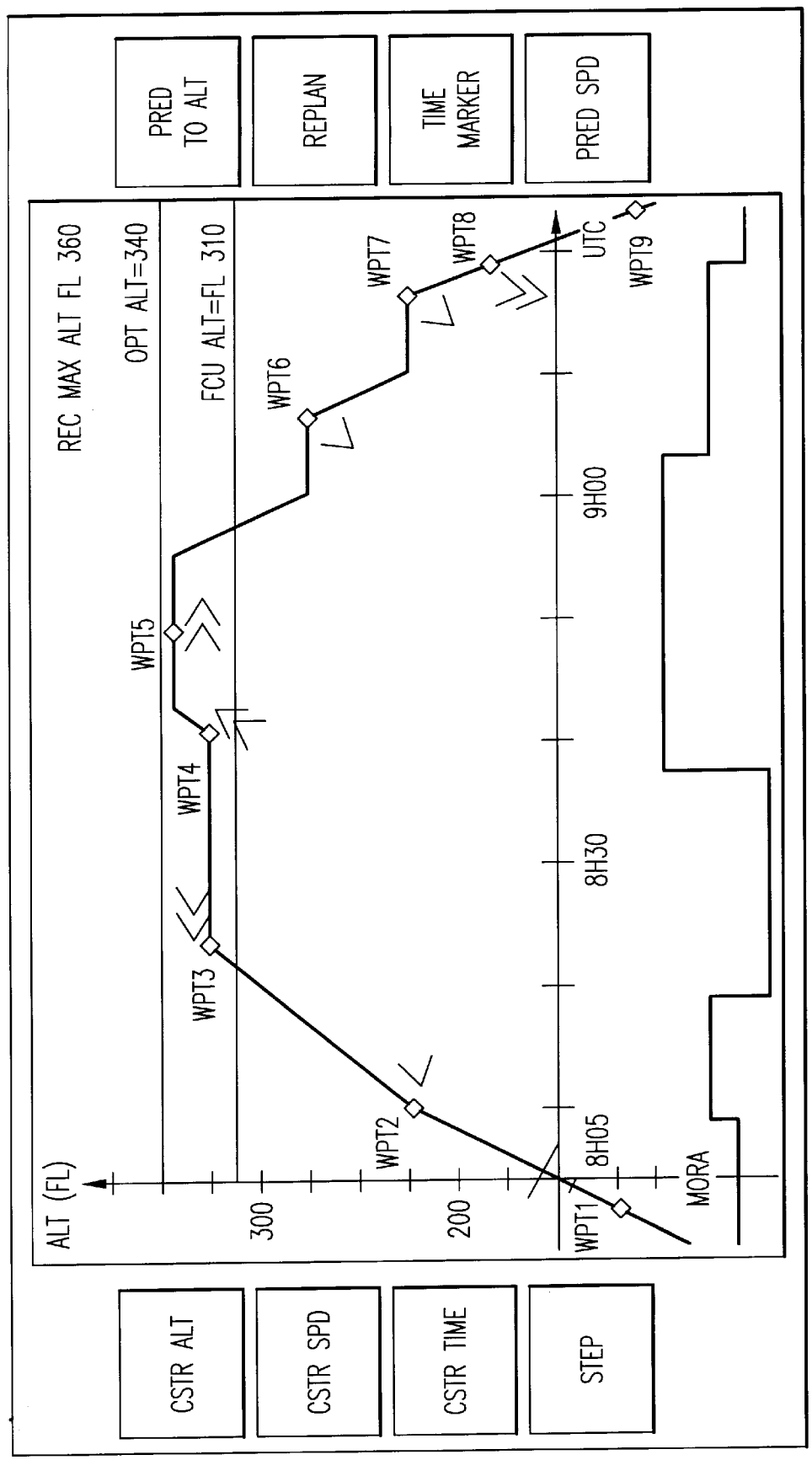
FIG. 3 represents an example of a vertical flight plan displayed by the process according to the invention.

FIG. 3 represents a display obtained with the means proposed by the present invention. This display can occupy the entire navigation display ND or just half; the display could also be produced on a screen other than the ND display.

The display comprises a horizontal time axis and a vertical altitude axis. The horizontal axis, or abscissa axis, is graduated in universal time (UTC), along a scale which scrolls over time. In the simplest example, scrolling is such that at each instant the origin of the time axis represents the current time at the moment of the display. In the graph, it is 8H05 at the time of display and the time scale scrolls from right to left. At 8.30 a.m. the display will be such that the graduation 8H30 will have moved to the left until it takes the place of the graduation 8H05 at the intersection of the abscissa axis and the ordinate axis. Provision may be made for the abscissa representing the current time to be a fixed point of the screen other than the intersection of the abscissa and ordinate axes, but it is more convenient to make provision for it to be this intersection.

The vertical axis, or ordinate axis, is graduated in terms of altitude. In the example represented, the graduation is defined in units of 100 feet (one foot=30 cm approximately), that is to say the graduation 300 corresponds to an altitude of 30,000 feet. The graduation can depend on the flight phases: up to a transition altitude, the graduation is in feet; it is then in terms of flight level (FL), that is to say in units of 100 feet.

In this embodiment, the altitude scale also scrolls: the graduations scroll downwards as the aircraft climbs, or scroll upwards as the aircraft descends, in such a way that the altitude of the aircraft at the instant of display is maintained at a fixed point. In the example represented, this fixed point is the intersection of the axes.

If the scales scroll in such a way that the point of intersection of the axes simultaneously represents the current time and the current altitude of the aircraft, it is understood that this point represents the position of the aircraft in the reference system at the relevant instant.

The flight plan is represented in this system of axes in the form of straight segments whose slopes represent the rates of climb and of descent, and whose horizontal plateaux represent the cruising altitudes between the periods of climb and/or of descent. Waypoints may be indicated in the form of diamonds on these segments. They are referenced WPT1 to WPT9 in the flight plan of FIG. 3. The waypoint WPT1 lying to the left of the ordinate axis signifies that this point has already been passed at the time of display. It is not absolutely necessary for that part of the flight plan which has already been carried out to be retained on the left of the ordinate axis, but it is however convenient to have a small fraction of it which represents the part most recently carried out.

It is the flight management system FMS which computes the plot of the straight segments to be displayed, from the theoretical flight plan data entered by the pilot and from actual data delivered by the aircraft's sensors, so that the vertical flight plan displayed does actually correspond to that which is occurring at the relevant moment. Naturally, provision may also be made for the flight management system to deliver only flight plan information and for the display terminal to be an intelligent terminal which is able to produce the plots from the information received.

It is understood that the position of a waypoint in the system of axes represents along the ordinate the desired theoretical altitude of transit above the waypoint, and along the abscissa the forecast instant of transit above this waypoint.

The management system therefore continuously recomputes the points to be displayed, as a function of the path actually followed by the aircraft.

An aircraft symbol is placed at the point representing the current time and the current altitude. This symbol is therefore placed in this example at the intersection of the time axis and the altitude axis. It remains at this fixed position while the time and altitude scales are scrolling. The orientation of the drawing of the symbol of the aircraft can turn about this position, so that this orientation represents the slope actually followed by the aircraft; the slope is the rate of variation of altitude per unit time; it can be computed by the flight management system from the data delivered by the sensors. Thus, the aircraft symbol represents in a very readable manner the climb slope of the aircraft and it is easy for the pilot to check that the tilt of the symbol corresponds to the slope of the plot of the flight plan segment displayed at a given moment.

It may be preferable for the altitude scale not to scroll while the aircraft is climbing; in this case, the aircraft symbol displayed stays put at the abscissa 0 (representing the current time), but it moves along the ordinate axis as the aircraft climbs or descends. Its orientation remains parallel to the current climb slope.

The symbol of the aircraft can be a symbol such as that represented in FIG. 3, representing a horizontal schematic view of the aircraft, or else a symbol representing a lateral schematic view of the aircraft.

The vertical flight plan thus displayed can comprise other indications, and most especially altitude constraints at the waypoints or altitude constraints during horizontal cruising. The altitude constraints at the waypoints could be represented by triangles pointing up or pointing down such as those of FIG. 2.

In the example represented, the following information appears on the screen:

the altitude safety margins (REC MAX alt) which are not to be exceeded, and/or the optimum flight altitude (OPT alt) computed by the flight management system as a function of predefined criteria, as well as the altitude clearance (FCU alt) permitted by air control and adjusted by the pilot on the FCU interface;

the value of the wind at the waypoints, in the form of symbols which depend on the strength of the wind and whose orientation depends on the direction of the wind;

the safety altitudes for the various phases of the flight; in FIG. 3, this is the staircase curve appearing at the bottom of the figure, which is split up into minimum-altitude plateaux (altitude referenced with respect to the graduation of the ordinate axis) for each segment of the vertical flight plan; the symbol of the aircraft must always be above this safety altitude; the safety altitudes are stored in a data base managed by the flight management system.

The altitude clearance FCU alt could flash and/or change colour in the event of the presence of another aircraft at a difference of less than 1000 feet (300 m), this in the case in which a presence detection system is provided or if radio data indicating this information are received by the flight management system. An audible alarm and an indication of the exact value of the vertical deviation could be given.

Preferably, a time marker which serves to define a time reference with a view to an action to be performed at the time indicated by this marker may be made to appear on the abscissa axis. When the time scale scrolls, the marker will approach the origin of the axes, and an alarm or specific indication (flashing, luminous signal on the screen or off the screen, audible warning, etc.) could be triggered by the flight management system when the marker reaches the origin. Naturally, several markers may be provided simultaneously at different times. In a convenient embodiment, the pilot acts on a touchpad in order to move a cursor along the time axis and "clicks" when the cursor is over the desired time position so as to create and display the time marker.

Function keys are provided around the viewing screen for special functions of this type which are related to the temporal display of the vertical flight plan. Thus, for example, the "TIME MARKER" function key situated on the right of the screen makes it possible, if it is depressed, to activate this marker creation function without modifying the display of the vertical flight plan.

The other function keys make it possible to carry out additional functions such as flight plan revision, display of the ground speed of the aircraft, etc.

The function keys on the left of the screen are keys CSTR ALT, CSTR SPD, CSTR TIME allowing the pilot to re-input constraints relating to altitude, to speed and to time respectively. The STEP key makes it possible to schedule a climb or a descent in the cruising phase for a long-haul flight.

The keys on the right of the screen make it possible to access the following functions:

PRED TO ALT: gives the time of transit at a specified altitude;

PRED SPD: allows the display of predictions of speed over the whole of the flight plan or over a particular waypoint;

REPLAN: displays the 5 closest airports and gives the possibility of computing predictions of time of arrival for each.

These keys are given merely by way of example; the REPLAN key could be associated with the lateral flight plan rather than with the vertical flight plan.

Generally, the lateral flight plan modification functions will pass on the changes (via the flight management system) to the vertical flight plan, and vice versa.

What is claimed is:

1. Process for aiding aerial navigation, using a flight management system which carries out a dialogue with the pilot by means of several interfaces which include at least one display screen, characterized in that the flight management system displays on the screen a time-graduated abscissa axis, an altitude-graduated ordinate axis, and, in this system of axes, a plot representing a theoretical path of an aircraft, and in that the flight management system scrolls the time axis in such a way as to maintain at a fixed position on the screen an abscissa representing the time at the instant of display.

2. Process according to claim 1, characterized in that the abscissa of fixed position representing the time at the instant of display is situated at the intersection of the abscissa and ordinate axes.

3. Process according to claim 2, characterized in that the flight management system scrolls the altitude axis in such a way as to maintain at a fixed position on the screen an ordinate representing the actual altitude of the aircraft at the relevant instant.

4. Process according to claim 2, characterized in that the plot of the path comprises symbols corresponding to characteristic points, the abscissa of these symbols being the forecast instant of transit above these points.

5. Process according to claim 2, characterized in that the flight management system displays a time marker on the scrolling abscissa scale and in that it activates an alarm when the time marker reaches the origin of the axes.

6. Process according to claim 2, characterized in that the flight management system controls the calculation and display of an aircraft symbol placed on the screen at a position representing the current time and the current altitude of the aircraft.

7. Process according to claim 1, characterized in that the flight management system scrolls the altitude axis in such a way as to maintain at a fixed position on the screen an ordinate representing the actual altitude of the aircraft at the relevant instant.

8. Process according to claim 7, characterized in that the ordinate of fixed position representing the actual altitude is situated at the intersection of the abscissa and ordinate axes.

9. Process according to claim 8, characterized in that the plot of the path comprises symbols corresponding to characteristic points, the abscissa of these symbols being the forecast instant of transit above these points.

10. Process according to claim 8, characterized in that the flight management system displays a time marker on the scrolling abscissa scale and in that it activates an alarm when the time marker reaches the origin of the axes.

11. Process according to claim 8, characterized in that the flight management system controls the calculation and display of an aircraft symbol placed on the screen at a position representing the current time and the current altitude of the aircraft.

12. Process according to claim 7, characterized in that the plot of the path comprises symbols corresponding to characteristic points, the abscissa of these symbols being the forecast instant of transit above these points.

13. Process according to claim 7 characterized in that the flight management system displays a time marker on the scrolling abscissa scale and in that it activates an alarm when the time marker reaches the origin of the axes.

14. Process according to claim 7, characterized in that the flight management system controls the calculation and display of an aircraft symbol placed on the screen at a position representing the current time and the current altitude of the aircraft.

15. Process according to claim 1, characterized in that the plot of the path comprises symbols corresponding to characteristic points, the abscissa of these symbols being the forecast instant of transit above these points.

16. Process according to claim 15, characterized in that the flight management system displays a time marker on the scrolling abscissa scale and in that it activates an alarm when the time marker reaches the origin of the axes.

17. Process according to claim 1, characterized in that the flight management system displays a time marker on the scrolling abscissa scale and in that it activates an alarm when the time marker reaches the origin of the axes.

18. Process according to claim 1, characterized in that the flight management system controls the calculation and display of an aircraft symbol placed on the screen at a position representing the current time and the current altitude of the aircraft.

19. Process according to claim 1, further comprising displaying safety altitudes for corresponding to segments of said theoretic path of said aircraft.

20. Device for aiding aerial navigation using a flight management system which carries out a dialogue with the pilot by means of several interfaces which include at least one display screen, characterized in that it comprises means for displaying on the screen a time-graduated abscissa axis, an altitude-graduated ordinate axis, and, in this system of axes, a plot representing a theoretical path of an aircraft, means being provided for scrolling the time axis in such a way as to maintain at a fixed position on the screen an abscissa representing the time at the instant of display.

21. Device according to claim 20, characterized in that means are provided for scrolling the altitude axis in such a way as to maintain fixed on the screen an ordinate representing the actual altitude of the aircraft at the instant of display.

22. Device according to claim 8, further comprising means for displaying safety altitudes for segments of said theoretical path of said aircraft.

* * * * *